US009800842B2

(12) United States Patent
Predmore, II

(10) Patent No.: US 9,800,842 B2
(45) Date of Patent: Oct. 24, 2017

(54) EFFICIENT DATA TRANSMISSION

(71) Applicant: UTC FIRE & SECURITY CORPORATION, Farmington, CT (US)

(72) Inventor: Thomas J. Predmore, II, Albany, OR (US)

(73) Assignee: UTC FIRE & SECURITY CORPORATION, Farmington, CT (US)

( * ) Notice: Subject to any disclaimer, the term of this patent is extended or adjusted under 35 U.S.C. 154(b) by 461 days.

(21) Appl. No.: 14/257,237

(22) Filed: Apr. 21, 2014

(65) Prior Publication Data

US 2014/0313336 A1 Oct. 23, 2014

Related U.S. Application Data

(60) Provisional application No. 61/814,637, filed on Apr. 22, 2013.

(51) Int. Cl.
*H04N 7/18* (2006.01)
*H04N 5/77* (2006.01)
(Continued)

(52) U.S. Cl.
CPC ............. *H04N 7/185* (2013.01); *H04N 5/772* (2013.01); *H04N 21/2187* (2013.01); (Continued)

(58) Field of Classification Search
USPC ........................................................ 348/148
See application file for complete search history.

(56) References Cited

U.S. PATENT DOCUMENTS 4,888,795 A * 12/1989 Ando ................. H04N 1/33307 348/14.12
6,038,257 A * 3/2000 Brusewitz .......... H04N 5/23293 348/14.14

(Continued)

FOREIGN PATENT DOCUMENTS

| | | |
|---|---|---|
| CN | 101370140 A | 2/2009 |
| KR | 100480520 B1 | 3/2005 |
| KR | 101198156 B1 | 10/2012 |

OTHER PUBLICATIONS

"Portable Video Server & DVR, Visuality T7712 Series Secure Store-and-Stream Media Appliance", Patton Electronics Company, Jan. 2013.

*Primary Examiner* — Leron Beck
(74) *Attorney, Agent, or Firm* — Cantor Colburn LLP

(57) ABSTRACT

A method for controlling video in a system includes receiving wirelessly at a stationary base station a low quality video from a mobile device, the mobile device configured to record both the low quality video and a high quality video of a same video stream, to store each of the low quality video and the high quality video, and to wirelessly transmit only the low quality video. The method includes analyzing the low quality video at the stationary base station and, based on the analysis, transmitting a signal to the mobile device to delete the low quality video and the high quality video from the mobile device, to allow overwrite of the low quality video and the high quality video from the mobile device, or to request transmission of the high quality video from the mobile device.

9 Claims, 2 Drawing Sheets

(51) Int. Cl.
*H04N 21/2187* (2011.01)
*H04N 21/231* (2011.01)
*H04N 21/234* (2011.01)
*H04N 21/472* (2011.01)
*H04N 21/6587* (2011.01)

(52) U.S. Cl.
CPC .. *H04N 21/23113* (2013.01); *H04N 21/23418* (2013.01); *H04N 21/47202* (2013.01); *H04N 21/6587* (2013.01)

(56) References Cited

U.S. PATENT DOCUMENTS 7,474,359 B2 1/2009 Sullivan et al.
8,350,907 B1 * 1/2013 Blanco .............. H04N 21/4335 348/143
8,615,164 B1 * 12/2013 Kotab .................. H04N 5/765 386/292
2002/0057894 A1 5/2002 Ishige
2002/0057902 A1 * 5/2002 Song ................. G11B 15/1875 386/356
2002/0064227 A1 5/2002 Van Der Schaar et al.
2002/0108115 A1 * 8/2002 Palmer .................. H04N 7/165 725/50
2003/0112347 A1 * 6/2003 Wyman ................. H04N 5/772 348/231.99
2004/0184531 A1 9/2004 Lim et al.
2004/0216173 A1 * 10/2004 Horoszowski .... G06F 17/30796 725/145
2004/0218099 A1 11/2004 Washington
2006/0062303 A1 * 3/2006 Xu ........................ G06T 7/2066 375/240.16
2007/0081794 A1 * 4/2007 Baynger ............. G11B 27/034 386/331
2007/0285519 A1 12/2007 Ahn et al.
2010/0141762 A1 6/2010 Siann et al.
2010/0150245 A1 6/2010 Camp, Jr. et al.
2010/0150252 A1 6/2010 Camp, Jr. et al.
2010/0333155 A1 * 12/2010 Royall .............. H04N 5/23203 725/105
2011/0096168 A1 * 4/2011 Siann .................... H04N 7/183 348/158
2012/0044383 A1 * 2/2012 Lee ..................... H04N 19/433 348/231.99
2014/0098228 A1 * 4/2014 Plante ............. H04N 21/23406 348/148

* cited by examiner

EFFICIENT DATA TRANSMISSION

CROSS-REFERENCE TO RELATED APPLICATION

This application claims the benefit of U.S. Provisional Patent Application Ser. No. 61/814,637, filed Apr. 22, 2013, the disclosure of which is incorporated by reference herein in its entirety.

BACKGROUND OF THE INVENTION

Embodiments of the present invention relate to video transmission and in particular to providing low resolution video for analysis prior to providing a high resolution video.

Mobile video recording systems, such as video recording systems in vehicles, may record and store video from multiple cameras over long periods of time. Customers often prefer video that has a high resolution (hi-res) and high frame rate. However, hi-res videos and videos with a high frame rate take up large amounts of space in a storage device that is constrained by size limitations of the mobile vehicle or apparatus in which the storage device is housed. In addition, the transfer of data in high resolution and having a high frame rate may lead to a long transmission time to transmit the video wirelessly to a base station for analysis.

BRIEF DESCRIPTION OF THE INVENTION

Embodiments of the present invention include a method for controlling video in a system includes receiving wirelessly at a stationary base station a low quality video from a mobile device, the mobile device configured to record both the low quality video and a high quality video of a same video stream, to store each of the low quality video and the high quality video, and to wirelessly transmit only the low quality video. The method includes analyzing the low quality video at the stationary base station and, based on the analysis, transmitting a signal to the mobile device to delete the low quality video and the high quality video from the mobile device, to allow overwrite of the low quality video and the high quality video from the mobile device, or to request transmission of the high quality video from the mobile device.

Embodiments of the invention further include a method of controlling video in a system. The method includes capturing video with a camera of a mobile video system, generating a low quality video and a high quality video based on the captured video and storing the low quality video and the high quality video in storage. The method also includes transmitting only the low quality video to a base station based on detecting a receiver of the base station within range of the mobile video system and allowing delete or overwrite of both the high quality video and the low quality video from the storage based on receiving from the base station a signal indicating that the low quality video is not necessary.

Embodiments of the invention further include a video transmission system including a vehicle having a mobile video system. The vehicle includes a camera configured to capture video images, an encoder configured to generate a high quality video and a low quality video of captured video images and storage that stores the high quality video and the low quality video. The vehicle also includes a transmitter that transmits only the low quality video to a base station. The vehicle also includes a controller that controls the storage to delete each of the low quality video and the high quality video from storage based on receiving a signal from the base station that the low quality video is not necessary based on an analysis of only the low quality video.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Mobile video recording systems may be required to store large amounts of data while having only a limited amount of storage, and transmitting the video data may take a long time when the video is high resolution. Embodiments of the invention relate to reducing an amount of video data stored in a mobile video recording system by transmitting to a base station a low resolution image and determining whether to delete or allowing overwrite of a corresponding high resolution image in the mobile video system.

Figure 1:
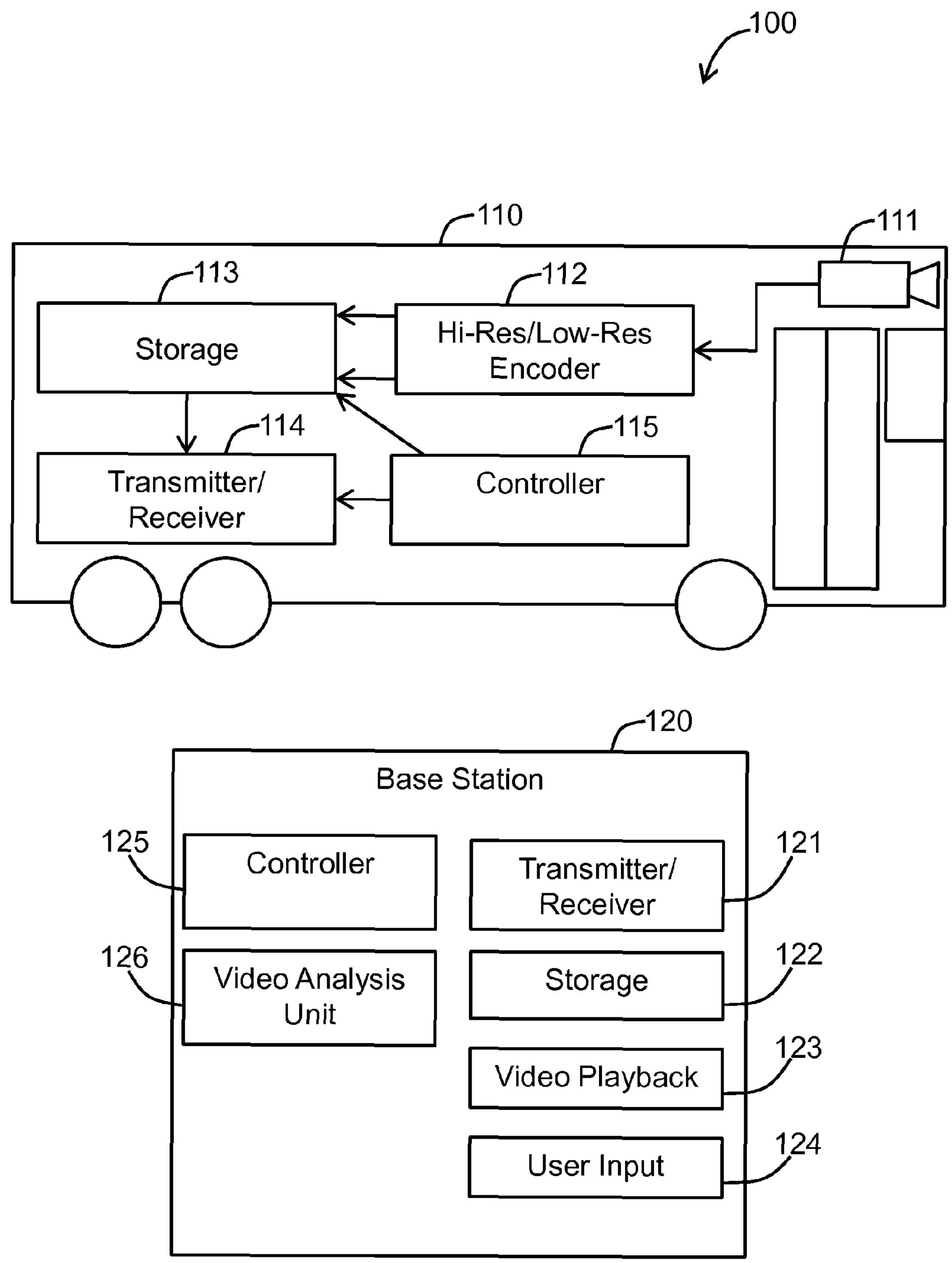
FIG. 1 illustrates a mobile video system according to one embodiment of the invention.

FIG. 1 is a diagram of a mobile video system 100 according to an embodiment of the invention. The system 100 includes a mobile vehicle 110 and an immobile base station 120. The vehicle 110 includes a camera 111, high resolution (hi-res) and low resolution (low-res) encoder 112, storage 113 and a transmitter/receiver 114. The base station 120 includes a transmitter/receiver 121, storage 122 and one or both of a video playback device 123 and a video analysis unit 126. The base station 120 may also include a user input device 124 to receive user input based on a video that is played back on the video playback device 123. A controller 125, including at least one processor, memory logic and other circuitry controls operation and communication between the different components of the base station 120.

In operation, the camera 111 in the vehicle 110 generates one or more video streams. In one embodiment, the camera is a digital camera that generates both a high quality video stream and a low quality video stream. In another embodiment, the camera is an analog camera that generates one video stream, and the encoder 112 generates the high quality video stream and the low quality video stream. The high quality video may have one or both of high resolution (hi-res) and a high frame rate, while the low quality video may have one or both of a low resolution (low-res) and a low frame rate. In other words, while FIG. 1 illustrates a hi-res and low-res encoder 112, the encoder may generate any two video streams where one video stream is of a higher quality video than the other, requiring more digital storage space than the other, and requiring a greater amount of transmission time for a given bandwidth than the other. Each of the hi-res and low-res video are saved in storage 113. In one embodiment, the storage 113 is a digital video recorder. The transmitter/receiver 114 receives data from the storage 113, or from the encoder 112, and transmits the data wirelessly. In one embodiment, the transmitter/receiver 114 is a local area network transmitter/receiver having one or more antenna to transmit the video wirelessly.

The camera 111 may be any type of camera capable of capturing video, including an analog camera connected to an analog-to-digital converter or any type of digital camera. In one embodiment, the hi-res/low-res encoder 112 is included in the camera 111, or in a housing defining the camera 111. In another embodiment, the high-res/low-res encoder 112 is a separate device from the camera 111. In one embodiment, the storage 113 is part of a digital video recorder (DVR) device, and the hi-res/low-res encoder 112 is part of the DVR device. In such an embodiment, the DVR device receives high quality video from the camera 111, such as analog video, and the hi-res/low-res encoder 112 converts the high quality video into a high quality video stream and a low quality video stream.

The storage 113 may be any type of storage device capable of storing video data, deleting or managing overwrite of the stored video data, and re-recording video data onto portions corresponding to previously-deleted video data or areas marked for overwrite. Examples of storage devices include storage disks, including magnetic and optical disks, solid-state or transistor-based memory, such as flash memory or any other type of storage. While FIG. 1 illustrates a vehicle 110 as housing the camera 111, hi-res/low-res encoder 112, storage 113 and transmitter/receiver 114, embodiments of the invention are not limited to vehicles, but encompass any mobile device capable of performing the functions of the camera 111, encoder 112, storage 113 and transmitter/receiver 114. In addition, embodiments of the invention encompass immobile or stationary devices capable of performing the functions of the camera 111, encoder 112, storage 113 and transmitter/receiver 114.

In operation, the camera 111 generates a video image and the encoder 112 encodes the video stream as both a hi-res video stream and a low-res video stream which is stored in storage 113. In one embodiment, the camera 111 is continually capturing video, or capturing while the vehicle 110 is in operation. For example, in one embodiment, the camera 111 is capturing continuously any time the engine of the vehicle 110 is turned on. The transmitter/receiver 114 initially transmits only a low-res video stream to the base station 120. In one embodiment, the transmitter/receiver 114 automatically detects that the base station 120 is in range and begins transmission upon performing a protocol handshake with the transmitter/receiver 121 of the base station. For example, the vehicle 110 may move to a variety of locations throughout a day, and the transmitter/receiver 114 may transmit only the low-res video when within a predetermined proximity of the base station 120.

The transmitter/receiver 114 may transmit video data corresponding to any length of time. In one embodiment, a controller 115 analyzes the video data stored in storage 113 and transmits only video that has not previously been transmitted to the base station 120. In another embodiment, the controller 115 controls the transmitter/receiver 114 to transmit only data that has been designated for transmission by a user. For example, in one embodiment, a user, such as a driver of the vehicle 110 presses a button when an event occurs, such as a incident with a passenger of the vehicle 110, an incident with another vehicle or structure, or any other incident for which the user believes a record of the incident may be useful. The controller 115 may then select recorded video for transmission. Selected video may be defined by a predetermined period of time before and after the pressing of the button, such as five minutes before and five minutes after the pressing of the button.

The base station 120 is a stationary structure, such as a building, that is configured to process and store video data. The transmitter/receiver 121 receives the low-res video data transmitted by the vehicle 110 and stores the low-res video in storage 122. In one embodiment, only the low-res video is transmitted and the high-res video is not transmitted to the base station 120. Instead, the hi-res video is initially stored only in the storage 113 of the vehicle 110. The low-res video may be analyzed at the base station 120 by one or both of a human user or computer. For example, in an embodiment in which the low-res video is analyzed by a user, the low-res video is provided to the video playback device 123 including a visual display. Based on viewing the low-res video in the video playback device 123, a user determines what actions to take with respect to the low-res video and the high-res video, and the user inputs commands via the user input 124. For example, the user may determine that the video is not necessary, but that the video should be retained in the storage 113 of the vehicle.

Alternatively, the user may determine that the video is not necessary, and the video may be deleted or overwritten from the storage 113 to free up space for additional video. In such an embodiment, a controller 125 may transmit data to the controller 115 of the vehicle indicating that the video may be deleted or overwritten, and the controller 115 may delete or allow overwrite of both the hi-res and the low-res video in the storage 113. Alternatively, the controller 115 may delete or allow overwrite of only the hi-res video in the storage 113.

According to yet another alternative, the user at the base station 120 may determine that the video is necessary. In this case, the controller 125 transmits a command to the controller 115 of the vehicle 110, based on a user input to the user input device 124, to transmit the hi-res video corresponding to the previously-transmitted low-res video to the base station 120. Accordingly, the base station 120 may store in storage 122 hi-res video of each video considered to be necessary from any number of vehicles. In addition, bandwidth may be preserved and video transmission times may be reduced by initially transmitting only a low-res video to the base station 120 from the vehicle 110. In addition, storage space may be preserved in the storage 113 by indicating that a hi-res and low-res video are permitted to be deleted or overwritten based on analysis of the low-res video at the base station 120.

While an embodiment has been described in which a user analyses the low-res video to determine if it is necessary, the low-res video may also be analyzed by a video analysis unit 126 capable of subjecting the video to digital analysis, including event recognition programs, personal identity recognition programs or any other algorithms or criteria to determine whether a video is necessary. If the video analysis unit 126 determines that the video is necessary, then the video analysis unit 126 may transmit a corresponding signal to the controller 125 without user input to request the hi-res video. In another embodiment, a user approval may be required to request a hi-res video after the video analysis unit 126 determines that the video is necessary based on predetermined criteria.

Figure 2:
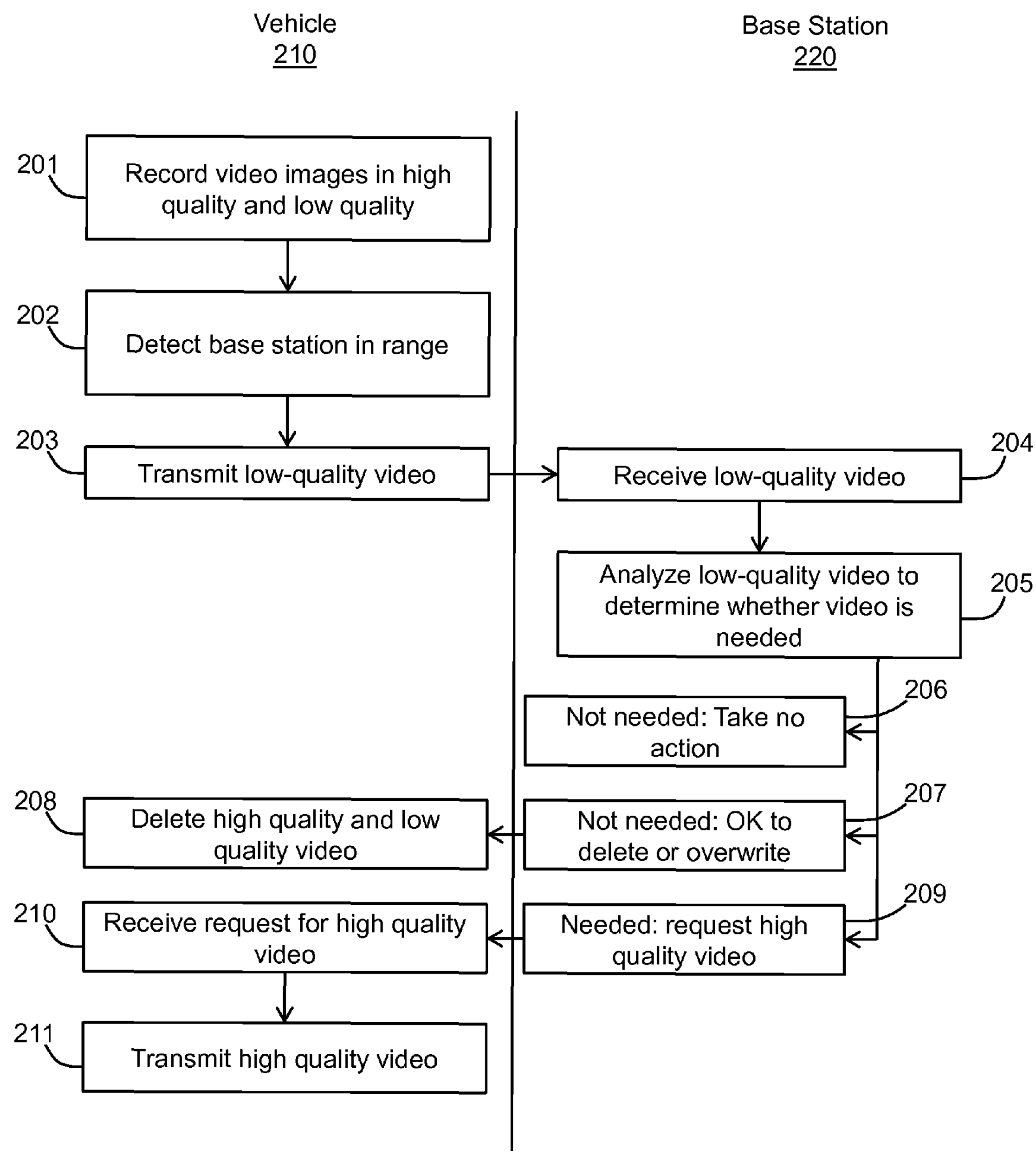
FIG. 2 illustrates a diagram of a method for transferring and storing video from a bus to a recording storage station according to an embodiment of the invention.

FIG. 2 illustrates a diagram of a method according to an embodiment of the invention. In block 201, a camera in a vehicle 210 generates a video image and the video image is stored as both a high quality stream and a low quality stream. In one embodiment, the high quality stream corresponds to a high resolution (hi-res) video and the low quality stream corresponds to a low resolution (low-res) video. In one embodiment, the hi-res video and the low-res video are generated by a same video encoder. In another embodiment, the high quality video stream corresponds to a video stream having a high frame rate and the low quality video stream corresponds to a video stream having a low frame rate. In yet another embodiment, the high quality video stream has both a high resolution and a high frame rate and the low quality video stream has both a low resolution and a low frame rate. The high-res video requires more storage and transmission bandwidth than a corresponding low-res video.

In one embodiment, the high and low quality video streams are continuously recorded and stored in digital storage. For example, the camera may be continuously capturing video which is stored as high and low quality video on storage on the vehicle 210 as long as the vehicle 210 is turned on.

In block 202, it is determined whether a base station 220 is in range. The base station 220 includes a wireless transmitter/receiver and digital storage to receive and store the video from the vehicle 210. In block 203, a wireless transmitter of the vehicle 210 transmits only a low quality video stream to the base station 220, and a wireless receiver of the base station 220 receives the low quality video. In one embodiment, a transmitter of the vehicle 210 automatically detects that the base station 220 is in range and automatically begins transmission without user input. The vehicle 210 may transmit video data corresponding to any length of time. In one embodiment, the vehicle 210 transmits only video that has not previously been transmitted to the base station 220. In another embodiment, the vehicle 210 transmits only data that has been designated for transmission. For example, in one embodiment, a user, such as a driver of the vehicle 210 presses a button when an event occurs, such as a incident with a passenger of the vehicle 210, an incident with another vehicle or structure, or any other incident for which the user believes a record of the incident may be useful. A controller in the vehicle may then select video a predetermined period of time before and after the pressing of the button for transmission, such as five minutes before and five minutes after the pressing of the button.

In block 205, the low quality video is analyzed to determine whether the video is needed. The determination as to whether a video is needed may be based on any predetermined criteria, including a determination whether an event captured in the video or other content in the video would be of interest to a user, owner, company or other entity. The low quality video may be analyzed at the base station 220 by one or both of a human user or computer. For example, a human user may view the video on a video display device, and a computer may analyze the digital content of the video.

Blocks 206, 207 and 209 represent three possible alternatives that may be selected by a user or computer at the base station 220. In block 206, if it is determined that the video is not necessary, no action may be taken, such that the video remains stored in the storage of the vehicle 210. Such a process may be carried out if digital storage space on the vehicle 210 is not an issue, if the low quality video needs to be reviewed again or at a later time, if another layer of review of the video is necessary prior to making a decision, or for any other reason.

In block 207, it may be determined that the video is not necessary, and the video may be deleted or overwritten from the storage to free up space for additional video. In such an embodiment, the base station 220 transmits a command to the vehicle 210 that the video may be deleted or overwritten, and the vehicle 210 may delete or allow overwrite of both the high-quality and the low-quality video from the storage in the vehicle 210. In such an embodiment, the high-quality video may never be transmitted to the base station 220 prior to being deleted or overwritten.

In block 209, it may be determined that the video is needed based on analysis of the low quality video. Accordingly, the high quality video is requested by the base station 220 and the vehicle 210 receives the request for the high quality video. The vehicle 210 transmits the high quality video corresponding to the previously-transmitted low quality video to the base station 220. Accordingly, the base station 220 stores high quality video of each video considered to be necessary from any number of vehicles. In addition, bandwidth may be preserved and video transmission times may be reduced by initially transmitting only a low quality video to the base station 220 from the vehicle 210. In addition, storage space may be preserved in a storage device of a vehicle 210 by deleting or allowing overwrite of high quality and low quality video in the storage device when it is determined based on analysis of the low quality video that the video is not needed.

While embodiments of the invention have been described above with respect to video capture, recording, storage and transmission, embodiments of the invention also encompass audio capture (via a microphone), recording, storage and transmission. In such embodiments, captured audio may be stored in both high quality and low quality, the low quality audio may be transmitted to an analysis unit, and the analysis unit may determine whether to request transmission of the high quality audio or whether to permit erasure or overwrite of both the high quality audio and low quality audio.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of controlling video in a system, comprising:

capturing video with a camera of a mobile video system;

generating a low quality video and a high quality video based on the captured video;

storing the low quality video and the high quality video in storage;

transmitting only the low quality video to a base station based on detecting a receiver of the base station within range of the mobile video system;

allowing delete or overwrite of both the high quality video and the low quality video from the storage based on receiving from the base station a signal indicating that the low quality video is not necessary;

transmitting a second low quality video to the base station; and transmitting to the base station a second high quality video corresponding to the second low quality video based on receiving from the base station a request for the second high quality video based on an analysis of the second low quality video by the base station.

2. The method of claim 1, wherein the low quality video is at least one of a low resolution video and a video having a low frame rate, and the high quality video is at least one of a high resolution video and a video having a high frame rate.

3. The method of claim 1, wherein the low quality video and the high quality video are generated continuously while the camera is on.

4. The method of claim 1, further comprising:

receiving a time selection indicating a time in the video stream; and transmitting only a portion of the low quality video stream within a predetermined time interval of the time selection.

5. A video transmission system, comprising:

a vehicle having a mobile video system, comprising:

a camera configured to capture video images;

an encoder configured to generate a high quality video and a low quality video of captured video images;

storage that stores the high quality video and the low quality video;

a transmitter that transmits only the low quality video to a base station; and a controller that controls the storage to delete each of the low quality video and the high quality video from storage based on receiving a signal from the base station that the low quality video is not necessary based on an analysis of only the low quality video;

wherein the transmitter is configured to transmit a second low quality video to the base station; and the controller is configured to control the transmitter to transmit a second high quality video to the base station based on receiving a request from the base station for the second high quality video based on analysis of the second low quality video.

6. The video transmission system of claim 1, wherein the low quality video is at least one of a low resolution video and a video having a low frame rate, and the high quality video is at least one of a high resolution video and a video having a high frame rate.

7. The video transmission system of claim 5, wherein further comprising a user input to generate a time indication signal, and the controller controls the transmitter to transmit only a portion of the low quality video within a predetermined time interval of the time indicated by the time indication signal.

8. The video transmission system of claim 5, wherein the base station comprises a video playback unit to generate a visual display of the low quality video and a user input device to generate the signal that the low quality video is not necessary based on analysis of the low quality video by a user.

9. The video transmission system of claim 5, wherein the base station comprises a video analysis unit to analyze digital data of the low quality to generate the signal that the low quality video is not necessary based on analysis of the digital data of low quality video by a processor.

* * * * *